United States Patent

[11] 3,633,401

[72] Inventor Ichiro Wada
 Yokohama, Japan
[21] Appl. No. 51,807
[22] Filed July 2, 1970
[45] Patented Jan. 11, 1972
[73] Assignee Tokyo Shibaura Electric Co., Ltd.
 Kawasaki-shi, Japan
[32] Priorities July 3, 1969
[33] Japan
[31] 44/52289;
 July 3, 1969, Japan, No. 44/52290

[54] METHOD AND APPARATUS FOR CHECKING ELECTROMAGNETIC FLOWMETERS
 5 Claims, 4 Drawing Figs.
[52] U.S. Cl..................................................... 73/3,
 73/194 EM
[51] Int. Cl....................................................... G01f 25/00
[50] Field of Search........................................... 73/3, 194
 EI

[56] References Cited
 UNITED STATES PATENTS
 2,844,568 7/1958 Mertz........................... 73/194 EM
 3,040,571 6/1962 Kolin............................ 73/194 EM
 3,095,744 7/1963 Hutchins et al................ 73/194 EM X Primary Examiner—Louis R. Prince
Assistant Examiner—William A. Henry, II
Attorney—Oblon, Fisher & Spivak ABSTRACT: A device for checking electromagnetic flowmeters includes a flat duct having a rectangular section which is made of an electrical insulating material. The flat duct has a pair of electrode which extend in a widthwise direction through the opposite sidewalls thereof. When it is desired to check the electromagnetic flowmeter, the flat duct is inserted into a tubular duct of the electromagnetic flowmeter such that the pair of electrodes of the former are positioned along a diameter of the latter. A small amount of liquid is then passed through the flat duct. Exciting means are provided for generating a magnetic flux around the tubular duct of the electromagnetic flowmeter to be checked. The magnetic flux generated passes through the liquid flowing through the flat duct in a direction perpendicular to a line extending between the pair of electrodes. In accordance with the liquid flow, an electromotive force is generated and the same may be measured to indicate the approval or rejection of the electromagnetic flowmeter.

PATENTED JAN 11 1972  3,633,401

INVENTOR
ICHIRO WADA

BY *Oblon, Fisher & Spivak*
ATTORNEYS 3,633,401

METHOD AND APPARATUS FOR CHECKING ELECTROMAGNETIC FLOWMETERS

BACKGROUND OF THE INVENTION

1. Field of the Invention

The present invention generally relates to a method and apparatus for checking an electromagnetic flowmeter, and more particularly to a method and apparatus for checking an electromagnetic flowmeter which includes a tubular duct through which a liquid whose flow is to be measured may be passed.

2. Description of the Prior Art

In a city water service main, for example, an electromagnetic flowmeter which includes a tubular duct having a large diameter in the range of 1 m. to 3 m. is generally employed for measuring the rate of flow of the water passing therethrough.

As is well known, such an electromagnetic flowmeter should be checked for approval prior to the actual use thereof. In the past, such a check has been made by actually passing water through the large diameter tubular duct of the electromagnetic flowmeter. While somewhat satisfactory, because of the necessity of passing water through the large diameter tubular duct, the prior art apparatus for the flowmeter checking was extremely large in size and expensive. Moreover, it is extremely difficult and troublesome for an operator to have to make checks using a large amount of water.

SUMMARY OF THE INVENTION

Accordingly, it is an object of this invention to provide a new and improved method and apparatus for the checking of electromagnetic flowmeters which utilize a tubular duct having a large diameter.

Another object of this invention is to provide a unique method and apparatus for checking an electromagnetic flowmeter wherein only a small amount of liquid flow is necessary for the checking thereof.

One other object of this invention is to provide a new and improved method and apparatus for the checking of an electromagnetic flowmeter which is small in size, inexpensive, and highly accurate.

Briefly, in accordance with this invention, these and other objects are in one aspect attained by providing a generally flat duct having a rectangular cross section and being made of an electrical insulating material. A pair of electrodes are provided and the same extend in a widthwise direction through opposite sidewalls of the flat duct. The flat duct is located within the tubular duct of the electromagnetic flowmeter such that the pair of electrodes are positioned along a diameter of the tubular duct. The flat duct is of a length sufficient to extend through the tubular duct of the flowmeter in a lengthwise direction thereof. A relatively small amount of liquid, which has the same conductivity as the actual liquid to be passed through the flowmeter after checking and approval thereof, is passed through the flat duct. Electromagnetic fluxes, which are generated by an exciting device mounted around the external surface of the tubular duct of the flowmeter, are passed through the liquid flowing through the flat duct and the path thereof is linked with and perpendicularly to the liquid flow. An electromotive force will be generated between the pair of electrodes in an amount proportional to the liquid flow being measured and the same will provide an indication for approval or rejection of the electromagnetic flowmeter.

BRIEF DESCRIPTION OF THE DRAWINGS

The present invention can be more fully understood from the following description when taken in connection with reference to the accompanying drawings, wherein.

DETAILED DESCRIPTION OF THE PREFERRED EMBODIMENTS

Figure 1:
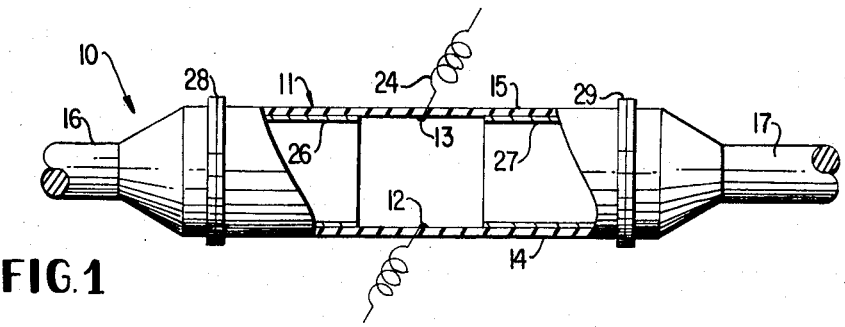
FIG. 1 is a plan view, partly broken away, of an apparatus for the checking of an electromagnetic flowmeter in accordance with this invention.
Figure 2:
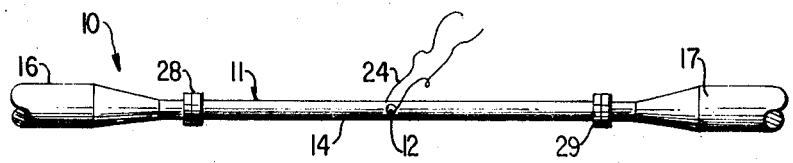
FIG. 2 shows a side view of the apparatus of FIG. 1.

Referring now to the drawings, wherein like reference numerals designate identical or corresponding parts throughout the several views, and more particularly to FIGS. 1 and 2 thereof, wherein an apparatus for the checking of an electromagnetic flowmeter 10 is shown as including a flat duct 11 which is made of an electrical insulating material, such, for example, a phenol resin, an epoxy resin, a polyester resin, or the like. The flat duct 11 has a substantially rectangular cross section and includes a pair of electrodes 12 and 13 which extend in a widthwise direction through opposite sidewalls 14 and 15 thereof. Conduits 16 and 17 are provided and the same are connected, respectively, to the opposite ends of the flat duct 11 in order to enable a liquid to be applied to and exhausted from the flat duct.

Figure 3:
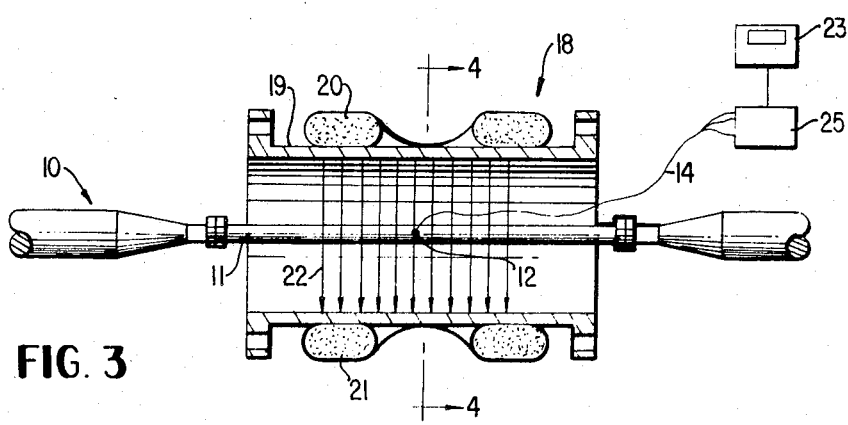
FIG. 3 is a sectional view of an electromagnetic flowmeter in which an apparatus for checking the same in accordance with this invention is shown; and, FIG. 4 is a cross-sectional view taken along the line 4—4 of FIG. 3 in a direction as shown by the arrows.
Figure 4:
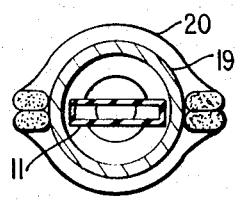

As shown in FIGS. 3 and 4, to check a flowmeter, such as the electromagnetic flowmeter 18, the flat duct 11 is inserted into a tubular duct 19 and extends along the entire length thereof. The flat duct 11 is also positioned lengthwise within the tubular duct 19 along its center axis. A pair of excitation windings 20 and 21 are provided and wound on the external surface of the tubular duct 19. The windings 20 and 21 are energized from an AC constant voltage source (not shown) and thereby generate AC magnetic fluxes 22 which pass through the flat duct 11.

The flat duct 11 is located within the tubular duct 19 such that the pair of electrodes 12 and 13 are positioned along a diameter of the tubular duct 19. The magnetic fluxes generated from the exciting windings 20 and 21 will pass through the flat duct 11 in a direction which is perpendicular to a line extending between the pair of electrodes 12 and 13.

As is clearly shown in FIG. 4, the width of the flat duct 11 is of a value substantially equal to a diameter of the tubular duct 19, so that substantially all of the magnetic fluxes generated form exciting coils 20 and 21 will pass therethrough.

In order to check the electromagnetic flowmeter, a small amount of fluid, which is similar to that of the actual fluid to be passed through the tubular duct 19 after approval of the electromagnetic flowmeter, is passed through the flat duct 11 from one end thereof to the other. When the liquid passing through the flat duct crosses the magnetic fluxes generated therein, an electromotive force will be generated in an amount corresponding to the liquid flow within the flat duct. The electromotive force so generated is received by the pair of electrodes 12 and 13 and then applied, as shown in FIG. 3, to an indicator 23 through conductors 24 and an amplifier 25 such that the amount of the fluid flowing through the flat duct is readily indicated.

Referring now, again, to FIG. 1, it is seen that a pair of magnetic shields 26 and 27, which may be made of a metal sheet or metallized layer, are provided at opposite portions of the inner surface of the flat duct 11 along the lengthwise direction thereof with the exception of a centered inner surface near the electrodes 12 and 13. The magnetic shields 26 and 27 are electrically connected to metal flanges 28 and 29 which, in turn, are connected to ground.

It should be understood that the magnetic flux density along the lengthwise direction of the flat duct 11 is usually uniform in the centered area thereof and gradually reduces therefrom towards the opposite ends of the duct. The grounded magnetic shields 26 and 27 serve to eliminate the effect of the magnetic flux density reduction at the ends of the duct by reducing the same such that essentially the only fluxes remaining will be in the center area of the flat duct and will have a uniform density therein.

It should now be apparent that in accordance with the teachings of this invention that because a flat duct made of an electric insulator is employed for the purposes of checking an electromagnetic flowmeter that only a small amount of liquid need be passed therethrough and that as such an electromagnetic flowmeter having a large diameter may be checked by apparatus which is both small in size and inexpensive to manufacture. Moreover, it should be apparent that the apparatus of the present invention is easier to handle by an operator because of the small size, light weight, and relatively small amount of liquid required for checking. In addition, with this invention, it is possible to check electromagnetic flowmeters with a higher accuracy than heretofore possible due to the use of a uniform flux density adjacent only to the electrodes of the flat duct. It should also be noted that the measuring accuracy of the electromagnetic flowmeter itself can be further improved by calibrating the same in accordance with the results of the checking apparatus which while reduced in size has a configuration similar to that of the actual electromagnetic flowmeter.

Obviously, numerous modifications and variations of the present invention are possible in light of the above teachings. It therefore should be understood that within the scope of the appended claims, the invention may be practiced otherwise than as specifically described herein.

What is claimed as new and desired to be secured by Letters Patent of the United States is:

1. A method of checking an electromagnetic flowmeter for the approval thereof comprising the steps of:
    positioning a flat-shaped duct made of an electrical insulator and having a substantially rectangular cross section within a tubular duct of the electromagnetic flowmeter, said cross section of the flat-shaped duct being smaller than that of the electromagnetic flowmeter and said flat-shaped duct being coincident with a diameter of said tubular duct in a widthwise direction thereof and extending through said tubular duct in the lengthwise direction thereof,
    flowing the same fluid which is to be passed through said tubular duct through said flat-shaped duct,
    passing magnetic fluxes which are generated from an exciting coil device mounted around said tubular duct through said flat-shaped duct in a direction perpendicular to the flow within said flat-shaped duct,
    receiving an electromotive force induced in said fluid flowing through said flat duct and corresponding to the flow between a pair of electrodes which respectively extend in a widthwise direction through the opposite sidewalls of said flat-shaped duct, and,
    measuring the amplitude of said electromotive force.

2. An apparatus for checking an electromagnetic flowmeter for the approval thereof comprising:
    a flat-shaped duct having a substantially rectangular section which is smaller than a cross section of a tubular duct of said electromagnetic flowmeter, said flat-shaped duct being positioned within said tubular duct and having a width which is nearly equal to a diameter of said tubular duct and a length which extends substantially lengthwise through said tubular duct;
    a pair of electrodes arranged to extend in a widthwise direction through the opposite sidewalls of said flat-shaped duct and being positioned along a diameter thereof;
    said flat-shaped duct being mounted within said tubular duct so as to allow magnetic fluxes to pass therethrough, said magnetic fluxes being generated from an exciting coil device mounted around the external surface of said tubular duct and passing through a liquid flowing within the flat duct such that the path of the magnetic fluxes is perpendicular to both a line connected between said pair of electrodes and the direction of said liquid flow; and
    a device for measuring an electromotive force generated and received by said pair of electrodes in accordance with the liquid flow in said flat duct.

3. An apparatus for checking an electromagnetic flowmeter for the approval thereof according to claim 2, wherein:
    said flat-shaped duct is made of an electrical insulating material.

4. An apparatus for checking an electromagnetic flowmeter for the approval thereof according to claim 2, wherein:
    said flat-shaped duct includes magnetic members provided on an inner surface of said flat-shaped duct with the exception of a center area which is adjacent to the area wherein said pair of electrodes are positioned.

5. An apparatus for checking an electromagnetic flowmeter for the approval thereof according to claim 4, wherein:
    said magnetic shield members are arranged so as to be connected to ground upon the checking of said electromagnetic flowmeter.

* * * * *